No. 872,244.
PATENTED NOV. 26, 1907.
C. MELCHERT.
YOKE FASTENER.
APPLICATION FILED APR. 6, 1907.
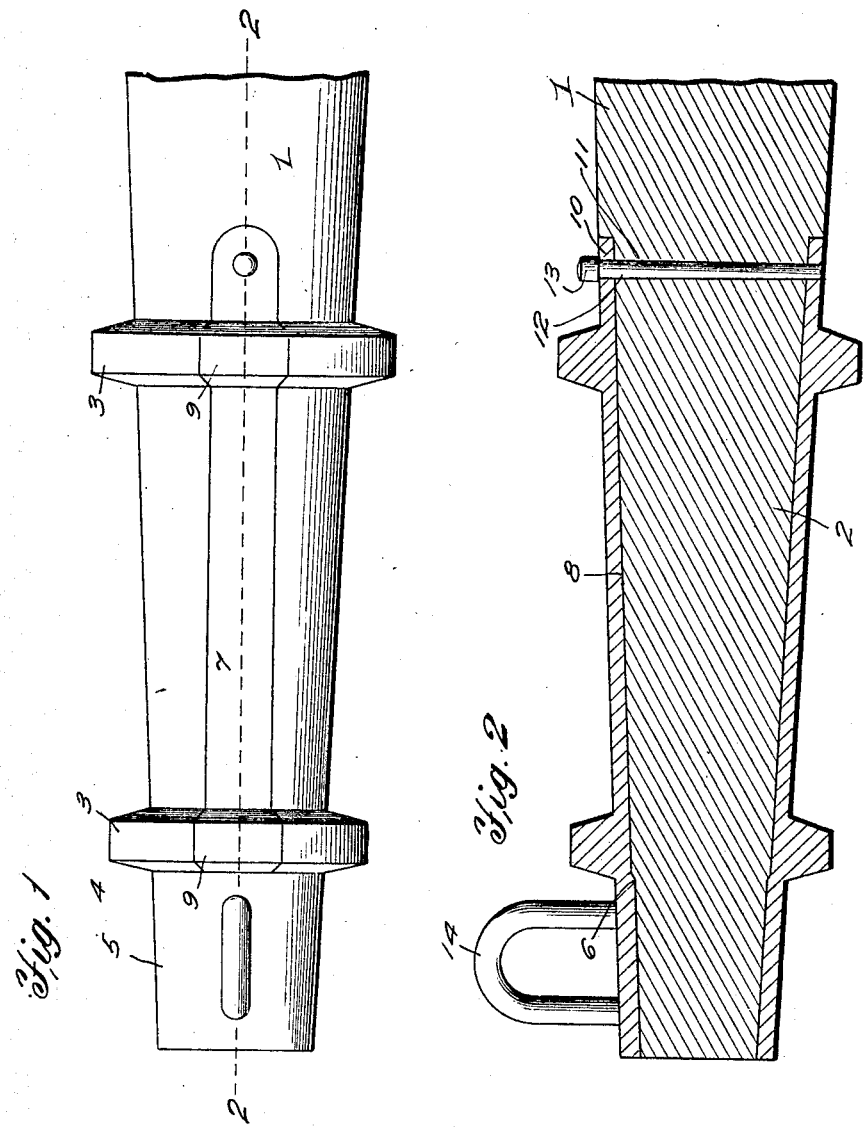
Witnesses
Inventor
Carl Melchert
By Victor J. Evans
Attorney

UNITED STATES PATENT OFFICE.

CARL MELCHERT, OF LYNCH, NEBRASKA.

YOKE-FASTENER.

No. 872,244.   Specification of Letters Patent.   Patented Nov. 26, 1907.

Application filed April 6, 1907. Serial No. 366,824.

*To all whom it may concern:*

Be it known that I, CARL MELCHERT, a citizen of the United States, residing at Lynch, in the county of Boyd and State of Nebraska, have invented new and useful Improvements in Yoke-Fasteners, of which the following is a specification.

The invention relates to an improvement in yokes, comprehending specifically a construction by which the yoke is adapted to maintain the harness connection against breakage or disconnection of the yoke attachments.

The main object of the present invention is the production of a yoke tip adapted for removable connection with the yoke bar and serving to permit attachment of the harness connections in a substantial and secure manner.

The invention in the preferred details of construction will be described in the following specification, reference being had to the accompanying drawings, in which:

Figure 1 is a plan of one end of a yoke bar illustrating my improvement applied thereto. Fig. 2 is a section on line 2—2, of Fig. 1.

Referring particularly to the drawings, my improvement is designed for connection with each end of a yoke bar 1, the end being gradually reduced in diameter as at 2. The yoke end is, as ordinarily constructed, formed with spaced annular bands or projections 3, forming limiting collars between which the choke strap is designed to be applied.

The present improvement comprehends specifically a ferrule 4 including a sleeve member 5 designed to fit over the free end of the yoke end, the latter being circumferentially reduced at 6 for the reception of the sleeve so as to expose the outer surface of the sleeve in a plane with the outer surface of the yoke end beyond the sleeve. The sleeve is provided at diametrically opposing points with rearwardly extending bars or extensions 7 designed to fit into appropriately shaped recesses 8 in the yoke end. The extensions 7 are preferably in the form of elongated fingers of comparatively narrow width, being of a length to project inwardly from the sleeve beyond the relatively inner collar 3. The recesses 8 for the reception of the extensions 7 open through the limiting collars, thereby removing the portions of these collars within the plane of the recesses. Each extension is provided with projections 9 corresponding in sectional contour and dimensions to the limiting collars and arranged to coincide with said collars when the attachment is in place, thereby completing the collars circumferentially of the yoke end. The free ends of the extensions 7 which, as before stated, terminate inwardly beyond the relatively inner collar 3 are formed with openings 10 to register with an opening 11 formed in the yoke end and adapted to receive a pin 12 having a head 13 for securing the ferrule extensions in place in the recesses 8.

The sleeve 5 of the ferrule member is provided with a staple 14 designed to receive and secure in place the ring to permit the connection of the harness breast straps to the yoke. The ring mentioned, arranged in the usual manner to encircle the yoke end, is secured against excessive movement by the staple.

In use, with the attachments secured as described, the choke strap encircles the yoke end between the collars 3, thus embracing and further securing in place the attachment. The breast straps are secured in the ring held in the staple 14 in the usual manner. The pin 12 secures the attachment against independent longitudinal movement, while the fitting of the extensions in the recesses 8 serves to prevent lateral movement of the attachment. The yoke ferrule provides a similar means of securing the harness attachments in place while absolutely guarding yoke end against breakage and thereby preventing disconnection of the harness member. The ferrule is, of course, to be constructed of metal, and it is to be understood that I do not limit myself to the specific details described, comprehending as within the spirit of the present invention such changes and variations as may fall within the scope of the appended claims.

Having thus described the invention, what I claim as new and desire to secure by Letters Patent is:—

1. A ferrule attachment for yoke ends comprising a sleeve member encircling the end of the yoke, and a plurality of extensions engaging the yoke in rear of the sleeve, and projections carried by the extensions to register with and form parts of the yoke limiting collar.

2. A ferrule attachment for yokes comprising a sleeve member to encircle the end of the yoke, a ring receiving staple carried thereby, and a plurality of extensions engaging the yoke in rear of the sleeve, each of said extensions being provided with projections to register with and form parts of the yoke limiting collars.

3. A ferrule attachment for yokes comprising a sleeve member to encircle the end of the yoke, a ring receiving staple carried thereby, a plurality of extensions engaging the yoke in rear of the sleeve, each of said extensions being provided with projections to register with and form parts of the yoke limiting collars, and a removable pin adapted to be passed through the sleeve extensions and yoke to secure the parts together.

In testimony whereof, I affix my signature in presence of two witnesses.

CARL MELCHERT.

Witnesses:
W. E. PICKERING,
JOHN KNAPP.